United States Patent [19]
Bueno

[11] Patent Number: 5,532,689
[45] Date of Patent: Jul. 2, 1996

[54] METHOD OF TRANSMITTING DATA QUICKLY AND SECURELY FROM A SMART CARD DURING A REMOTE TRANSACTION

[75] Inventor: Serge Bueno, Bretigny Sur Orge, France

[73] Assignee: Compagnie Generale D'Automatisme CGA-HBS, Bretigny Sur Orge, France

[21] Appl. No.: 271,664

[22] Filed: Jul. 7, 1994

[30] Foreign Application Priority Data

Jul. 9, 1993 [FR] France ................................. 93 08482

[51] Int. Cl.$^6$ .................................................. G08G 1/00
[52] U.S. Cl. ........................... 340/928; 235/384; 380/23; 902/26
[58] Field of Search ................................. 340/928, 932.2, 340/905; 364/401; 235/384, 380, 382; 380/23, 24; 902/26

[56] References Cited

U.S. PATENT DOCUMENTS

| | | | |
|---|---|---|---|
| 5,101,200 | 3/1992 | Swett | 340/928 |
| 5,120,939 | 6/1992 | Claus et al. | 902/26 |
| 5,310,999 | 5/1994 | Claus et al. | 380/23 |
| 5,317,636 | 5/1994 | Vizcaino | 380/23 |
| 5,379,344 | 1/1995 | Larsson et al. | 380/23 |
| 5,422,473 | 6/1995 | Kamata | 340/928 |
| 5,424,727 | 6/1995 | Shieh | 340/928 |
| 5,450,051 | 9/1995 | Stromberg | 235/380 |

FOREIGN PATENT DOCUMENTS

| | | |
|---|---|---|
| 0323326A1 | 7/1989 | European Pat. Off. . |
| 0425961A2 | 5/1991 | European Pat. Off. . |
| 2247096 | 2/1992 | United Kingdom . |
| WO9118354 | 11/1991 | WIPO . |

*Primary Examiner*—Brent A. Swarthout
*Attorney, Agent, or Firm*—Sughrue, Mion, Zinn, Macpeak & Seas

[57] ABSTRACT

A method of transmitting data quickly and securely from a smart card during a remote transaction between a fixed station and a mobile item of equipment containing a smart-card reader, said card reader having a fast memory, wherein, on receiving said card, and in addition to storing the data from the card in said fast memory, said reader also stores a pair of data items in said fast memory, one of which data items identifies the number of the card, and the other data item corresponds to an access count indicating the number of accesses to the card, each access by any reader incrementing the access count in the card by unity, and wherein, during the transaction, the mobile item of equipment, which is interrogated remotely by the fixed station, compares said pair of data items stored in said fast memory of said reader with the pair of data items of the card that is currently inserted in the mobile item of equipment, and transmits the result of the comparison and the data of the card, which data is stored in the fast memory, to the fixed station.

4 Claims, 1 Drawing Sheet

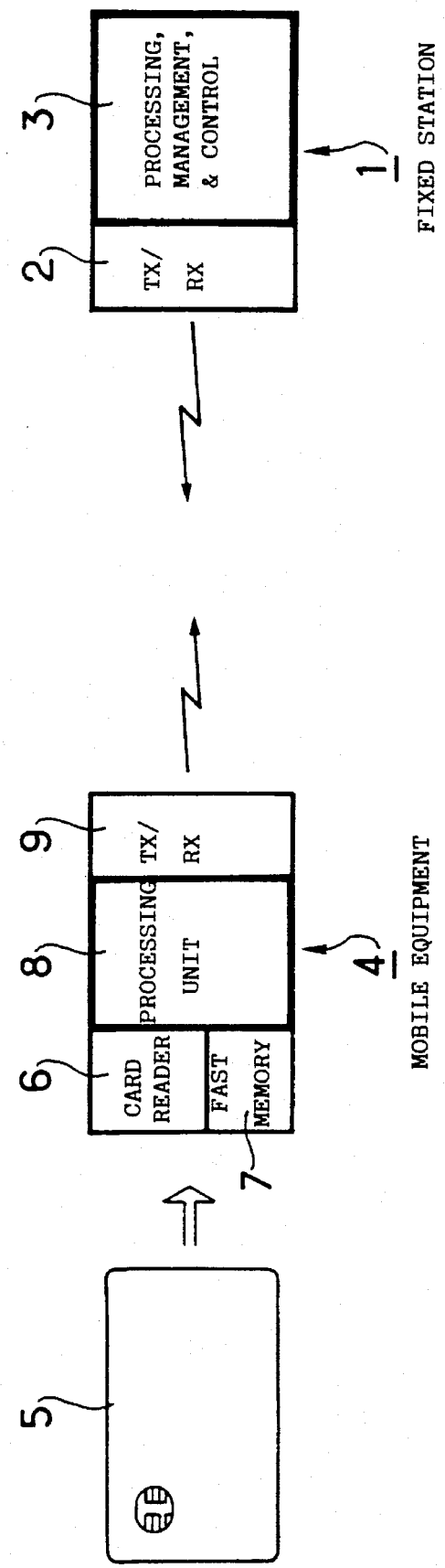

METHOD OF TRANSMITTING DATA QUICKLY AND SECURELY FROM A SMART CARD DURING A REMOTE TRANSACTION

The present invention relates to a method of transmitting data quickly and securely from a smart card (a card provided with a chip) during a remote transaction between a fixed station and a mobile containing a smart-card reader (the term "mobile" is used herein to designate any item of equipment capable of telecommunication while moving).

BACKGROUND OF THE INVENTION

The invention is particularly applicable to remote toll systems that enable transactions to be performed between control stations and vehicles travelling at high speeds. The invention is also applicable to access control for persons provided with equipment that is capable of communicating over short distances with access control stations.

In general, such communication takes place via electromagnetic waves or via light waves. Such waves offer short communication times as a result firstly of authorized communication time, and secondly of the ratio of the size of the zone in which communication is possible (the zone covered by the waves) divided by the speed of the mobile. However, existing smart cards are designed for applications in which there are no major constraints concerning the speed at which the card must be read, e.g. in banking or telephone applications.

Therefore, the constraint concerning the shortness of the duration of the communication and of the transaction, for remote transactions, is generally incompatible with the performance levels of currently known smart cards.

To solve that problem, one known solution consists in storing data from the card in a fast memory of the on-board reader on inserting the card into the on-board reader, so that during the transaction, it is the data stored in the fast memory of the on-board reader that is transferred via electromagnetic waves or via light waves to the fixed station, thereby enabling the data to be transferred quickly and thus making the transaction possible.

The fast memory of the on-board reader is loaded automatically by means of a presence-detecting contact which triggers an automatic updating procedure to update the fast memory of the on-board reader.

Although that solution enables data to be transferred quickly during the transaction, it nevertheless suffers from a major drawback: there is no guarantee that the data stored in the fast memory of the reader is genuinely the same as the data contained in the card that is actually inserted into the reader at the time of the transaction, because tampering is possible.

After having inserted a first card which triggers updating of the memory of the on-board reader, a dishonest person might lock the card-detecting contact mechanically, and insert a new card. In this way, at the time of the transaction, the fixed equipment will receive data relating to a card that is not inserted in the reader. Other types of fraud are also possible.

OBJECTS AND SUMMARY OF THE INVENTION

Therefore, an object of the invention is to mitigate that drawback. To this end, the invention provides a method of transmitting data quickly and securely from a smart card during a remote transaction between a fixed station and a mobile item of equipment containing a smart-card reader, said card reader having a fast memory, wherein, on receiving said card, and in addition to storing the data from the card in said fast memory, said reader also stores a pair of data items in said fast memory, one of which data items identifies the number of the card, and the other data item corresponds to an access count indicating the number of accesses to the card, each access by any reader incrementing the access count in the card by unity, and wherein, during the transaction, the mobile item of equipment, which is interrogated remotely by the fixed station, compares said pair of data items stored in said fast memory of said reader with the pair of data items of the card that is currently inserted in the mobile item of equipment, and transmits the result of the comparison and the data of the card, which data is stored in the fast memory, to the fixed station.

In this way, by means of the method of the invention, the pair of data items used (the card number and the access count giving the number of accesses to the card) unambiguously identify the contents of a card. Furthermore, the pair of data items is a pair of data items which have durations that remain constant regardless of the number and of the size of the other data items contained in the card but which identify said other data items. The pair of values may be referred to as the Card Contents Universal Identifier ("CCUI") and, at the time of the transaction, it is read by the mobile item of equipment which compares it with the "CCUI" that was stored at the time of the insertion of the card, but reading the "CCUI" of the inserted card is quick because the "CCUI" is a very short item of information, generally only 64 bits long.

Identifying the card and its contents by means of the "CCUI" is based on the facts that a card is identified unambiguously by manufacturer's serial number, and that it is not possible to access its contents without the card being powered and without it undergoing an initialization procedure.

BRIEF DESCRIPTION OF THE DRAWING

The sole figure of the accompanying drawing is a diagram which illustrates the method of the invention.

MORE DETAILED DESCRIPTION

The diagram shows a fixed station 1, e.g. corresponding to a motorway toll station. The fixed station contains a transmitter-receiver module 2, and a processing, management and control module 3. The vehicle (not shown) contains a mobile item of equipment 4 constituted by a housing capable of receiving a smart card 5. The mobile item of equipment 4 includes a reader 6 having a fast memory 7, a processing unit 8, and a transmitter-receiver module 9.

On being inserted into the housing of the mobile equipment 4, a card such as 5 is powered and it undergoes an initialization procedure causing a "counter" to be incremented by unity in the card, the contents of the counter being an access count corresponding to the number of successive accesses to the card. The access count together with the number of the card constitute a pair of items of data that may be referred to as the Card Contents Universal Identifier ("CCUI"). The CCUI is read and stored in the fast memory 7 together with the other data of the card 5.

When the mobile item of equipment 4 arrives in the zone covered by the transmitter-receiver 2 of the fixed station 1, the mobile item of equipment 4, which is interrogated by the fixed station 1, starts by "waking up" the card 5 inserted in the housing of the mobile item of equipment so as to read the CCUI of the card and so as to compare it with the CCUI stored in the fast memory 7. It should be noted that, by reading the CCUI of the inserted card, the mobile item of equipment causes the counter to be incremented by unity. In this way, if no fraud has been committed, the result of the comparison made between the CCUI read from the card, and the CCUI stored in the fast memory 7 is normally a difference of unity.

The result of the comparison together with the data of the card, which data is stored in the fast memory 7, are transmitted by module 9 to the fixed station 1.

In this way, the method of the invention makes it possible to detect any fraud consisting in removing a card from the housing 4 while locking the card-presence detecting contact, and in inserting another card. If such a fraud is attempted, the fact that the card numbers are not the same is detected at the time of the transaction.

The method also makes it possible to detect any fraud consisting in removing the card while locking the card-presence detecting contact, and in modifying the contents of the card by inserting it into another card reader. The fraud is then detected at the time of the transaction by comparing the access counts (given by the counter).

It is also possible to detect any defect in the card-presence detecting contact preventing the CCUI from being updated on inserting the card.

I claim:

1. A method of transmitting data quickly and securely from a smart card during a remote transaction between a fixed station and a mobile item of equipment containing a smart-card reader, said card reader having a fast memory, the method comprising the steps of: inserting said card in said reader; storing data from the card in the fast memory of said reader, said data comprising a pair of data items including a first data item and a second data item, said first data item identifying the number of the card, and said second data item corresponding to an access count indicating the number of accesses to the card; incrementing the access count in the card by unity upon each access by the reader, said step of incrementing being performed internally by the card; comparing said pair of data items stored in said fast memory of said reader with the pair of data items from the card that is currently provided in the mobile item of equipment, said step of comparing being performed by the mobile item of equipment during the remote transaction; and transmitting the result of the comparison and the data stored in the fast memory to the fixed station.

2. The method defined in claim 1, further comprising the step of initially incrementing said access count in the card by unity when said card is inserted, said step of initially incrementing being performed internally by said card prior to when said access count is incremented upon each access by said reader.

3. The method defined in claim 1, wherein the step of incrementing the access count is performed by a counter in the card.

4. The method defined in claim 2, wherein said step of incrementing the access count upon each access by said reader is performed by a counter in the card.

* * * * *